Patented Dec. 27, 1949

2,492,673

UNITED STATES PATENT OFFICE 2,492,673

CONDITIONING MOLASSES AND THE LIKE FOR PRODUCTION OF CITRIC ACID BY FERMENTATION

John C. Woodward and Raymond L. Snell, Elkhart, Ind., and Richard S. Nicholls, Ogmore-by-Sea, Wales, assignors to Miles Laboratories, Inc., Elkhart, Ind., a corporation of Indiana No Drawing. Application April 21, 1947, Serial No. 742,968

6 Claims. (Cl. 195—36)

This invention relates, generally, to improvements in the production of citric acid by fermentation of a carbohydrate medium, and it has particular relation to a new and useful method of conditioning commercial ash-containing carbohydrate mediums so as to place them in optimum condition for production of citric acid by fermentation with *Aspergillus niger*.

The present invention is a continuation-in-part of our copending application, Serial No. 434,890, filed March 16, 1942, now abandoned.

It has long been known that carbohydrates, such as sugars, are fermentable by the action of certain moulds so as to yield citric acid. (Currie, The Citric Acid Fermentation of *Aspergillus niger*, J. Biol. Chem. 31, 15—1917.)

By the expenditure of considerable research and development effort on the part of numerous workers, the fermentation process has been developed to the point where it is estimated that about two-thirds of the annual production of citric acid in the United States is made by this process.

Since the fermentation process is carried out commercially on a large scale, it is necessary from the cost standpoint to use an inexpensive carbohydrate medium, available in large quantities. Probably the best commercial carbohydrate medium, and the one most widely used for this purpose is invert molasses. This product is also known as "high-test molasses" and "Cuban high-test molasses." This material is an evaporated sugar cane juice that contains all the ash and all the original sugar of the juice, most of the sugar being in an inverted form as a result of acid hydrolysis. Typically, invert molasses will weigh about twelve pounds per gallon and will contain about 25% by weight sucrose and about 50% by weight of invert sugar. The sum of the sucrose and invert sugars usually amounts to 70–80%. A particularly important feature of invert molasses in connection with its use as a carbohydrate source in the fermentation process of making citric acid is its relatively low ash content, which usually runs from 1.2–2.4% by weight.

Other carbohydrate mediums that may sometimes be used are: corn syrup, raw sugar juices, beet molasses, citrus molasses, and carbohydrate containing solutions, preferably of low-ash content. Cane and beet blackstrap molasses are not usually satisfactory because these products have such a high mineral ash content (i. e. about 8–10%) as to result in excessive purification costs.

Although it is well known that there are many citric acid producing fungi which will ferment a carbohydrate medium, such as invert molasses, to produce citric acid, *Aspergillus niger* strains are the species of choice. Other fungi may be used, such as *Aspergillus clavatus*, *Aspergillus ventii*, *Aspergillus leuchensis*, *Penicillium citrium*, *Penicillium luteum*, and *Mucor piriformis*. However, *Aspergillus niger* strains are preferred because they are rapid, virile growers, tolerate high acidities, are comparatively stable physiologically, react reproducibly, and can produce large quantities of spore material to facilitate large scale inoculations. This last characteristic is possessed to much lesser degrees by most of the other species mentioned, and they are accordingly less desirable.

From the above, it will be seen that for practical reasons, in the commercial production of citric acid by fermentation, invert molasses is the preferred carbohydrate medium while *Aspergillus niger* is the preferred mould. Accordingly, the invention will be described with particular reference to the use of these preferred materials.

When fermentation of raw invert molasses is attempted with a strain of *Aspergillus niger*, selected because of good acid producing ability on refined sugar media, very little mycelial growth results due to the high sugar concentration. When the molasses is diluted to a lower sugar concentration (e. g. 15–20%) and standard major nutrients supplied, some growth results, but citric acid production is negligible, since the fungus passes rapidly (2–3 days) into the sporulative stage of resting inactivity, accompanied by an accumulation of autolysis and decomposition products. Maximum resulting acidities range from 0.5–0.75%, corresponding to conversions of sugar to citric acid of 3–4%, although other acids including oxalic are usually present in traces.

As the result of experimental work with refined sugar media, it has been previously established that in order to obtain large citric acid yields (i e. high sugar conversion) the mould growth must be made abnormal so as to prolong the vegetative stage and postpone the sporulative stage. Furthermore, it has been previously established that such abnormal mould growth and associated fermentation condtions may be controlled to a large extent by the presence of "trace" concentrations of certain nutrients. Additionally, we have found that the presence of certain of these cations depress the production of citric acid and these cations must either be eliminated or reduced to certain tolerable concentrations.

The nutrients required for the production of cellular structure include nitrogen, magnesium, phosphorus, potassium, sulfur, oxygen, carbon and hydrogen.

We have found that invert molasses, and the other commercial carbohydrate media mentioned above, present a complicated and non-uniform picture with respect to their cation content. That is, these carbohydrate mediums may:

a. Contain cations which are unfavorable to the production of citric acid or which become unfavorable when present in excess of certain levels, b. Contain certain normally beneficial cations in such concentrations as to be detrimental to a good yield of citric acid, c. May lack certain essential nutrient cations, or contain these cations below the requisite concentrations.

The picture is even more complicated, in view of the fact that not only do different lots of the same type of carbohydrate medium (e. g. invert molasses) vary widely in respect to their cation content, but even samples from the same lot vary considerably.

Thus, commercial carbohydrate mediums, such as invert molasses, are not in optimum condition for fermentation to citric acid, and require standardization before being used for this purpose.

Logically, two possible ways of putting these carbohydrate mediums in optimum condition for fermentation are suggested. The first solution would be to purify the carbohydrate medium so as to rid it completely of all cations and anions, and thereafter proceed to add the desired nutrients in established optimum concentrations. By analogy this would be equivalent to starting out with pure refined sugar. The second solution would be to analyze carefully each batch of carbohydrate medium and then make such removals and additions of cations and other nutrients as might be required to yield the established optimum concentrations.

However, neither of these solutions is practical or satisfactory. Purification of commercial carbohydrate mediums, and even one such as invert molasses which has a relatively low ash content, to the point where it can be considered completely freed of all cations and anions, is not practical primarily because the purification costs would be prohibitive. On the other hand, the highly refined analytical procedure necessary to control the carbohydrate medium according to the second suggested solution would obviously be expensive and impractical for large scale operations.

According to the present invention, we have found a method which is simple, reliable and convenient whereby a commercial carbohydrate medium, and particularly invert molasses, may be practically and inexpensively adapted to the fermentation of citric acid. The method may be carried out by operating personnel of ordinary skill. In brief, we have found that carbohydrate media, particularly invert molasses, may be conveniently and practically purified for fermentation purposes by means of a cation-exchange material operating on the hydrogen cycle with the purification process controlled largely in respect to the Fe ion. Many and varied trials have shown that if the Fe content of invert molasses is reduced to a predetermined level by contact with a cation-exchange resin operating on the hydrogen cycle, the carbohydrate will be so conditioned with respect to Fe as well as the other cations, that it can be placed in condition for fermentation to citric by additions of standardized predetermined amounts of nutrients.

It has been further found that to be placed in optimum condition for fermentation to citric acid by *Aspergillus niger*, the carbohydrate medium, such as invert molasses, must contain Zn ions in a definite proportion to the content of Fe ions.

Accordingly, the object of this invention, generally stated, is the provision of a practical and reliable method whereby impure carbohydrate mediums, and particularly invert molasses, may be inexpensively placed in an optimum condition for fermentation to citric acid, more particularly by the use of *Aspergillus niger*.

Other objects of the invention will, in part, be obvious and will in part appear hereinafter.

For a more complete understanding of the nature and scope of the invention, reference may now be had to the following detailed description thereof, wherein preferred embodiments of the invention are described.

It has been found that invert molasses invariably contains Fe and variably contains Na, K, Mg, Ca, Mn, Co and Pb, in addition to trace concentrations of a large number of the mineral elements. It appears that among the cations that may be present, Fe is uniformly predominant and will usually be present in a concentration of from 100–500 parts per million (P. P. M.). Experience has shown that the Fe content should preferably be reduced to 2–4 P. P. M., and at least within the range of .5–5 P. P. M. This reduction in Fe content is effected in part by dilution of the molasses, and in part by exchange for hydrogen ions on contact with a cation-exchange resin operating on the hydrogen cycle.

Ion-exchange resins are of the cation-exchange type and the anion-exchange type. These synthetic exchange materials are described in the following papers and patents: Adams and Holmes, J. Soc. Chem. Ind., vol. 54, 1—6T (1935); and Patents No. 2,104,501 and No. 2,191,853. A cation-exchange resin suitable for the purposes of this invention is "Amberlite IR–1" conveniently available in the open market under such trade name as of the filing date of our copending application, Serial No. 434,890, filed March 16, 1942, now abandoned. This resin is a phenolic-aldehyde resin polymer containing sulfonic acid groups. The H-ions of the sulfonic acid groups are exchangeable for other cations in what is called the "hydrogen cycle."

The hydrogen cycle may be represented by the following reversible equation:

$$\text{H-resin} + \text{cation-anion} \rightleftarrows \text{cation-resin} + \text{H}^+\text{-Anion}$$

The above reaction may be shifted predominantly to the right by employing a freshly regenerated cation-exchange bed and controlling the flow rate of the carbohydrate medium therethrough, so as to allow adequate contact time for ion exchange. As would be expected for this type of exchange action, which generally follows the law of mass action, as complete removal of cations from the carbohydrate medium is more nearly approached, the rate of exchange is greatly reduced and utilization of a freshly regenerated exchange column and longer contact times become more essential. Accordingly, from the standpoint of purification costs, it is very important that the operation be so controlled that the cations do not have to be and are not removed below the predetermined toleration levels. Removal of cations below these levels adds unnecessarily to the cost of producing the citric acid. As pointed out above, the present invention provides a practical, uniform and convenient method of purification control, which depends upon following the Fe concentration, whereby only the minimum amount of purification is required.

It will be seen that the extent to which cation removal will take place is a function of the pH, and at a given pH value of the carbohydrate medium in contact with cation-removing resin particles, an equilibrium will be set up between the acidity produced from exchange of resin-held H-ions for anion-bound cations, and the cations thus potentially liberatable from the resin. When invert molasses is used as the carbohydrate medium, the pH at which optimum range of Fe concentrations (i. e. 2–4 P. P. M.) can be maintained in the diluted decationized molasses is 1.39–1.41 for the selected strain of *Aspergillus niger* used.

Starting with a molasses having a sugar content of 80%, the necessary initial dilution lies between the range of 3 to 4 parts of added water to each part of molasses. At dilutions within this range sugar concentrations will be within the desirable range for fermentation. Higher dilutions of the original molasses, and, incidentally the ash contained therein, will permit the exchange reaction to go further in the direction of iron removal with a higher observed effluent pH, while lower dilutions of the molasses and ash will produce lower pH's (higher acidities) and a correspondingly lower efficiency of iron removal. For example, at a dilution resulting in an effluent molasses from the ion-exchange bed of pH 1.5, the iron in the second treatment cycle can be reduced to below 1 P. P. M., instead of 2 to 4 P. P. M., permitting it to remain at an effluent pH value of 1.35 to 1.4.

After the carbohydrate medium has been adequately purified by passage through the cation-exchange resin, the nutrients are added, and the medium is sterilized. The purified medium may be sterilized before or after the nutrients are added. Adjustment of pH for fermentation is necessary and this may be effected by adding an innocuous alkali, such as high-grade NaOH to the decationized medium. After cation purification, sterilization, pH adjustment, and addition of nutrients, the carbohydrate medium is in optimum condition for fermentation to citric acid. The medium, thus standardized, is inoculated with spores of a citric acid producing fungus, preferably *Aspergillus niger*, and the fermentation is carried out according to the best available techniques. After the fermentation period the citric acid may be recovered from solution by precipitating it as an insoluble salt (e. g. calcium citrate). The precipitate is then washed and allowed to react with a stronger acid, such as sulfuric acid, thereby liberating the organic acid in the free state according to well-known procedures.

The nutrients are added in predetermined amounts which may be standardized for each type of carbohydrate medium and fungus used. When invert molasses is the carbohydrate medium and *Aspergillus niger* is the fungus, nutrients will be added to supply N, K, Mg, Zn, P, S and Cl. The S and Cl may be put in as $SO_4^{--}$ and $Cl^-$, and P as $PO_4^{---}$. The N may be supplied as the ammonium ion, urea or as the nitrate ion. It is not necessary to add Fe, since the purified molasses will already contain this ion in adequate concentration. Technical grade nutrients are satisfactory.

As stated above, it has been found that for many strains of *Aspergillus niger*, high yields of citric acid require that the carbohydrate medium contain Zn in a concentration dependent upon the concentration of the Fe. When the carbohydrate medium is invert molasses there should be from 10–30 parts of Zn to each part of Fe, and preferably 20 parts of Zn to each part of Fe. Zn cannot be tolerated in excess of 150 P. P. M. by most strains of *Aspergillus niger*.

The following example will serve as a specific illustration of a preferred embodiment of the invention:

A 2.5 gallon batch of invert molasses having a total sugar content of about 75% and an ash content of about 2% is diluted with 3 volumes of water up to ten gallons. The thus diluted molasses is passed through anion-exchange bed containing about .28 cubic foot of a suitable cation-exchange resin operating on the H-cycle. A cation-exchange resin which is satisfactory for this purpose is described in an article by Meyers, Eastes and Myers, Jr., Ind. G. Eng. Chem., vol. 33, page 698 (1941). The ratio of the diameter of the ion-exchange bed to the height should be approximately 3 to 10. The column should be in a regenerated condition. The pH of the effluent from the bed is measured, preferably by a recording potentiometer. When the pH of the effluent from the bed drops to about 1.7 to 1.8 from about 2.5 to 3, it is collected in a suitable vessel. The first portion of the effluent from the column before its pH is reduced to 1.7 to 1.8 is collected separately and used to dilute the next batch of molasses. The rinsings of the column prior to regeneration are also used for dilution purposes.

The rate of flow through the bed is controlled so that the effluent from the bed gives a constant pH reading of 1.39 to 1.41, although it may go as low as 1.3 depending upon the initial ash concentration. When the pH of the effluent is about 1.4, it has been found that the Fe content will not exceed 15 P. P. M. after this first de-ionization treatment.

After the batch of molasses has been run through the first bed it is mixed thoroughly. At this point sugar analysis will indicate the occurrence of a drop in sugar concentration corresponding to an additional 1 to 2% dilution of the partially purified molasses. Part of this dilution is caused by the residual water in the resin bed; part of this dilution is intentionally effected by starting the collection of the effluent molasses before dilution effects caused by effluent water preceding the molasses have ceased; the remainder of this dilution is effected by continuing to collect last portions of effluent molasses which contain water used to displace the molasses from the resin bed.

This dilution between decationizations appears to be normally required and is utilized to effect the required reduction in Fe to 2–5 P. P. M. This is brought about by the slight (1–2%) reduction in H+-anion concentration with the corresponding increase in potential cation-exchange ability.

The second decationization is then carried out using a freshly regenerated bed of resin, in the same fashion as the first decationization, except that dilution effects are minimized, to keep the carbohydrate concentration at 13 to 20%, which is satisfactory for fermentation.

In purifying a second batch of molasses, the molasses can be first passed through the bed which was previously second in the series, and secondly through a freshly regenerated bed. The absolute capacity of the bed is only reduced by a negligible amount by the second treatment, since the first treatment removes 99% of the total ash.

The pH of the decationized invert molasses is adjusted to about 2.1 to 2.8, preferably 2.5, by addition of sufficient high-grade sodium hydroxide to give a concentration of .12%. Then the nutrients are added to this purified molasses so as to give the following concentrations:

|  | Per cent |
|---|---|
| $NH_4NO_3$ | .2 |
| $KH_2PO_4$ | .06 |
| $MgSO_4.7H_2O$ | .07 |
| $ZnSO_4.7H_2O$ | .0176–.022 |

The batch can be sterilized by holding at 50–60° C. for about fifteen minutes, before pH adjustment with NaOH, or at a temperature of thirty to forty degrees higher after pH elevation.

The batch is next cooled to a temperature of about 31° C., transferred to shallow aluminum pans and inoculated with a strain of *Aspergillus niger*, selected because of its ability to produce citric acid in high yields. Fermentation is permitted to take place as an aerobic process, sterile humidified air being supplied to the trays at a predetermined optimum rate for the strain under the conditions of medium depth and nutrient composition employed.

After five to eight days of fermentation the maximum amount of citric acid usually will have been formed. Yields of citric acid based on the sugar content of the molasses of as high as 77% can be expected. That is, from 75–77% of the carbohydrate present in invert molasses can be converted to citric acid. Acidities of 15–18% in terms of citric acid have been produced in the media. Normally, no oxalic acid can be detected.

Citric acid may be recovered from the solution in accordance with known procedures, as outlined above.

It will be noted that during the purification by cation exchange, the pH of invert molasses will be lowered from approximately 4–5 to about 1.3–1.4. In addition to being requisite in following the degree of decationization, the lowering of pH is otherwise functionally useful in that it makes the purified medium much easier and economical to sterilize by heating to comparatively low temperatures. Thus, expensive pressure-heat sterilization is avoided.

As will be noted from the foregoing, de-cationization alone is sufficient and de-anionization is not required.

It will be understood that this invention is of a nature permitting certain modifications of procedure and technique, depending upon specific conditions and materials, without departing from the principles thereof.

Having fully described the invention and a preferred method of practicing the same, what is claimed as new is:

1. In the process of producing citric acid by fermentation of invert molasses with *Aspergillus niger*, the improvement which comprises diluting the molasses with about three volumes of water, and decationizing the diluted molasses in two decationization steps by passing the diluted molasses through a first bed of cation-exchange resin operating on the H-cycle for effecting the first decationization step and then through a freshly regenerated second bed of cation-exchange resin operating on the H-cycle the second bed for effecting the second decationization step, allowing a slight further dilution of the diluted molasses between said two decationization steps, said two decationization steps effecting the reduction in the Fe content of the decationized molasses to within the range of approximately 2–4 P. P. M. with substantially all of the Fe removal being effected in said first decationization step and adding Zn to the decationized medium in the proportion of 10–30 parts of Zn for each part of Fe remaining in said decationized medium, the total Zn in addition not exceeding 150 P. P. M.

2. The improvement called for in claim 1 wherein said slight further dilution of the diluted molasses between said two decationization steps is a 1–2% dilution.

3. The improvement called for in claim 1 wherein each of said first and second beds of cation-exchange resin has a volume at least equal to approximately one-fifth of the volume of said diluted molasses passed therethrough.

4. A process of producing citric acid which comprises decationizing an ash-containing carbohydrate medium wherein Fe is the predominant cation by diluting the carbohydrate medium with water, decationizing the diluted carbohydrate medium in two decationization steps by passing the diluted medium through a first bed of cation-exchange resin operating on the H-cycle for effecting the first decationization step and then through a freshly regenerated second bed of cation exchange resin operating on the H-cycle for effecting the second decationization step, allowing a slight further dilution of the diluted medium between said two decationization steps, said two decationization steps effecting the reduction in the Fe content of the decationized medium to within the range of 0.5–5 P. P. M., sterilizing the decationized medium as well as adding nutrients thereto including Zn, said Zn being added in the proportion of 10 to 30 parts of Zn for each part of Fe remaining in said decationized medium with the total Zn addition not exceeding 150 P. P. M., and the other nutrients being added in predetermined optimum amounts, and fermenting the thus conditioned medium to citric acid with a viable strain of *Aspergillus niger*.

5. A process of producing citric acid which comprises diluting invert molasses with water, diluting the molasses with water, decationizing the molasses in two decationization steps by passing the diluted molasses through a first bed of cation-exchange resin operating on the H-cycle for effecting the first decationization step and then through a freshly regenerated second bed of cation exchange resin operating on the H-cycle for effecting the second decationization step, said two decationization steps effecting the reduction in the Fe content of the decationized molasses to within the range of 0.5–5 P. P. M., sterilizing the decationized molasses as well as adding nutrients thereto including Zn, said Zn being added in the proportion of 10 to 30 parts of Zn to each part of Fe, and the other nutrients being added in standardized optimum amounts, inoculating the thus conditioned molasses with *Aspergillus niger* and fermenting it to citric acid.

6. The process called for in claim 5 wherein reduction of the Fe content to within the range of .5 to 5 P. P. M. is achieved by controlling the pH of the decationized solution to a pH of about 1.4 to 1.3

JOHN C. WOODWARD.
RAYMOND L. SNELL.
RICHARD S. NICHOLLS.

(References on following page)

REFERENCES CITED

The following references are of record in the file of this patent:

UNITED STATES PATENTS

| Number | Name | Date |
|---|---|---|
| 2,006,086 | May et al. | June 25, 1935 |
| 2,191,365 | Boyd | Feb. 20, 1940 |
| 2,353,771 | Szucs | July 18, 1944 |
| 2,394,031 | Waksman et al. | Feb. 5, 1946 |

FOREIGN PATENTS

| Number | Country | Date |
|---|---|---|
| 805,092 | France | Aug. 25, 1936 |
| 833,631 | France | July 29, 1937 |
| 8,305 | Great Britain | of 1900 |

OTHER REFERENCES

Industrial & Engineering Chemistry, Nov. 1934, pages 1142–1149, by Doelger.

Industrial & Engineering Chemistry, Feb. 1926, pages 180–182, by Bachler.

Industrial & Engineering Chemistry, June 1941, pages 677–706, by Meyers.

Botanical Review, vol. V., April 1939, No. 4, pages 207–235, by Foster.